United States Patent [19]
Gillyns et al.

[11] 3,758,251
[45] Sept. 11, 1973

[54] ELECTROSTATIC PINNING OF POLYMERIC FILM

[75] Inventors: Emile Gillyns, Sandweiler; Norbert Thill, Itzig, both of Luxembourg

[73] Assignee: E. I. du Pont de Nemours and Company, Wilmington, Del.

[22] Filed: Dec. 2, 1971

[21] Appl. No.: 204,072

[52] U.S. Cl............... 425/174.8 E, 226/94, 264/22
[51] Int. Cl.............................................. B29h 5/24
[58] Field of Search.................. 425/174, 174.8; 226/93, 94; 264/22

[56] References Cited
UNITED STATES PATENTS

| 3,571,853 | 3/1971 | Denton | 425/174 |
| 3,174,748 | 3/1965 | Roberts et al. | 271/51 X |
| 3,039,388 | 6/1962 | Brandt et al. | 226/94 X |

*Primary Examiner*—H. A. Kilby, Jr.
*Attorney*—Donald W. Huntley

[57] ABSTRACT

An apparatus for electrostatic edge pinning of thermoplastic film to a quench surface comprising a pinning wire positioned substantially parallel to the quenching surface and over each edge of the polymeric film.

3 Claims, 4 Drawing Figures

3,758,251
PATENTED SEP 11 1973
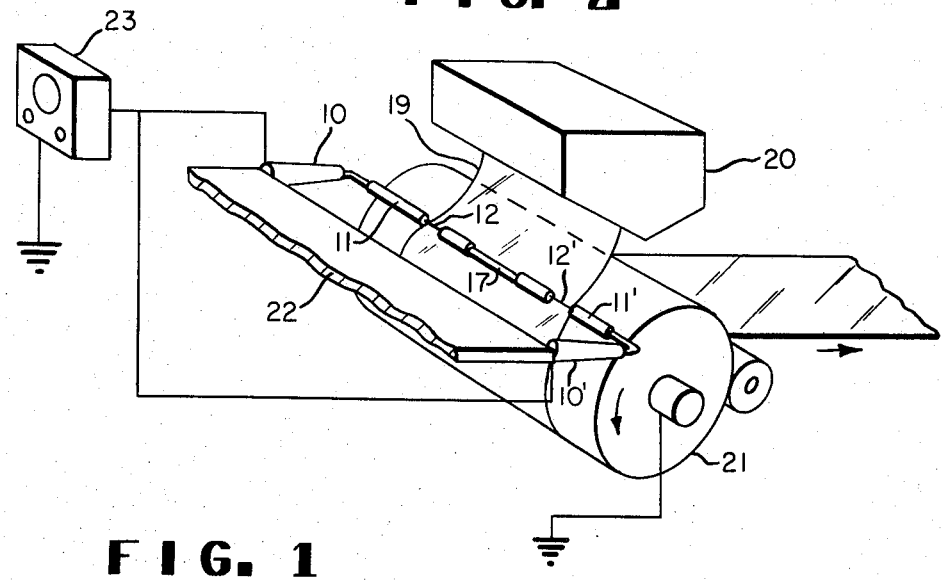
FIG. 2
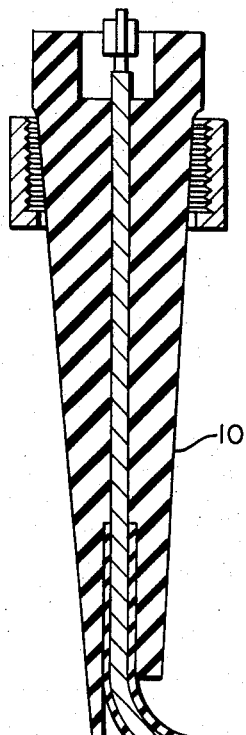
FIG. 1
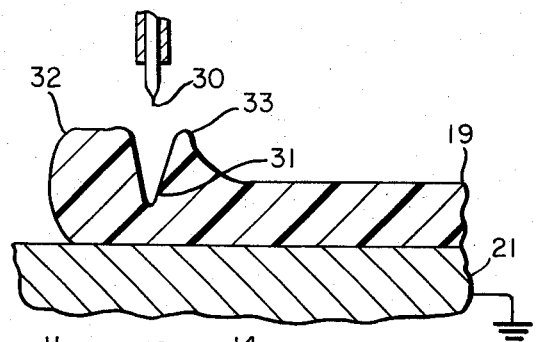
FIG. 3
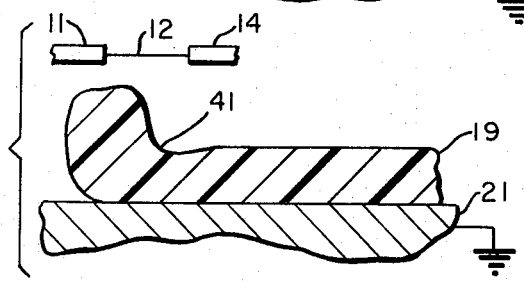
FIG. 4
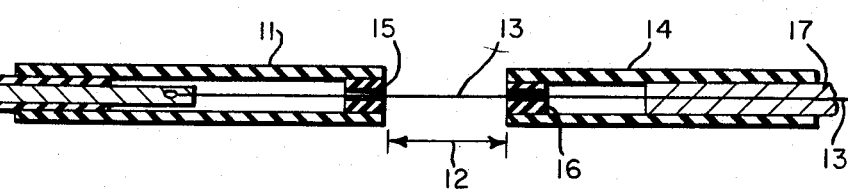

3,758,251

ELECTROSTATIC PINNING OF POLYMERIC FILM

BACKGROUND OF THE INVENTION

The preparation of many types of polymeric film involves extruding a molten sheet of polymer from a slit die onto a cooled quenching surface.

In the past, electrostatic pinning means have been used to force the freshly extruded film into more intimate contact with the quenching surface. One apparatus commonly used is a small diameter wire extending over the full width of a freshly extruded web immediately above the touchdown point, a high voltage being passed through the wire to force the web into contact with the grounded quench drum. Unfortunately, with increased casting speeds, an effect known as "pinner bubbles" develops in which small quantities of air are occluded between the extruded web and the surface of the drum, resulting in optical defects in the finished film product. Accordingly, at exceptionally high production rates, point pinning probes are used for electrostatically pinning only the edges of the freshly extruded film, thereby preventing undesirable neck-in of the film as it cools. Edge probes of this type commonly used in the art include those described in Owens & Vieth, U.S. Pat. No. 3,223,757.

The use of such point probes, however, has heretofore resulted in a substantial indentation in the film at the point at which the electrode is directed. This indentation renders the margin of the film unsuitable for commercial use, due to the irregularity of the thickness at this point. In addition, this thinner portion of the film resulting from the use of point probes can cause breakage in the transverse orientation process because of the weakness of the film at this point.

SUMMARY OF THE INVENTION

The instant invention provides an improved apparatus and process for electrostatic edge pinning that alleviates the difficulties previously encountered with point probes.

Specifically, the instant invention provides an apparatus for pinning the edges of a molten, thermoplastic, polymeric film extruded from a die onto an electrically grounded quenching surface, which apparatus comprises at least one uninsulated wire electrode, connected to a high voltage source and positioned above the approximate touchdown point of the film onto the quenching surface and substantially parallel to the quenching surface, the uninsulated electrode being above only those portions of the film adjacent each lateral edge of the film, and preferably within the 5 percent of the width of the film adjacent each edge.

BRIEF DESCRIPTION OF THE DRAWINGS

FIG. 1 is a cross-sectional view of an electrode support apparatus that can be used in the instant invention.

FIG. 2 is a perspective view of an extrusion apparatus using the electrode arrangement of the instant invention.

FIGS. 3 and 4 are representative cross-sectional illustrations, respectively, of the edges of films having been pinned to a quenching surface using a conventional point probe and an electrode arrangement of the instant invention.

DETAILED DESCRIPTION OF THE INVENTION

The present invention is based on the discovery that one or more lengths of pinning wire, parallel to the web, can be used for edge pinning a molten extruded web, in applications where the concentrated force of an electrostatic point probe was previously used. At the same time, the use of pinning wires for edge control results in less damage to the film product during pinning, facilities subsequent transverse direct orientation and provides ease of adjustment of the pinning force during operation.

The pinning wire used in the instant invention can be of the type generally used in the art, as described, for example, in Owens et al., U.S. Pat. No. 3,223,757, hereby incorporated by reference. A fundamental requirement of the invention is that uninsulated sections of the wire, that is, those sections not surrounded or shielded from the grounded drum by dielectric, be positioned over each edge of the extruded film to impart the required pinning force. Accordingly, the supports for the pinning wire can vary widely, including apparatus in which pieces of wire are separately supported over each edge of the web. Preferably, however, for maximum flexibility in the operation of the present apparatus, a single wire is supported over the full width of the extruded web, as with full width pinning, except that the central portions of the wire are insulated by a suitable means to prevent the deposition of ions at all points except the edges of the film.

Apparatus that can be used for the support of the wire electrode in accordance with the instant invention includes supports of the type illustrated in FIG. 1 and described in detail in Denton et al., U.S. Pat. No. 3,571,853, hereby incorporated by reference. In apparatus using two separate wires positioned at the outer edges of the extruded film, two lateral supports of the type illustrated in FIG. 1 as element 10 can be used to maintain the pinning wire above the edges of the extruded web and parallel to the surface. However, to permit maximum flexibility in the adjustment of the length of uninsulated pinning wire over the edge portions of the film, it is preferred that two such lateral supports be used to bear a wire across the full width of the extruded web, in combination with insulating members on the middle portion of the wire. Such an arrangement is illustrated in schematic cross-section in FIG. 1 in which electrode support element 10 is provided with movable sleeve 11 for adjustment of the uninsulated portion 12 of electrode wire 13. The central portion of the electrode wire is covered with fixed insulation 17 as well as movable insulating sleeve 14. The movable sleeves 11 and 14 have plugs 15 and 16 with apertures formed therein through which the electrode can pass, and the insulating sleeves fit snugly over insulation 17 of the electrode as well as the lateral support. The length of the uninsulated portion of the electrode can be adjusted by the positioning of sleeves 11 and 14, even when the pinning apparatus is in operation, using a dielectric stick or wand.

In a pinning operation using the apparatus of FIG. 1, a corresponding apparatus 10' supports the other end of the wire with a second uninsulated portion positioned over the opposite edge of the extruded web. Such an arrangement is illustrated in perspective view in FIG. 2, in which molten web 19 is extruded from hopper 20 onto metal quench roll 21. Mounted on frame 22 are lateral supports 10 and 10' which support wire 13 in a taut condition as it spans roll 21, parallel to the roll surface, close to the normal touchdown point of web 19 as it is cast on the rotating drum. The location of uninsulated electrode sections 12 and 12', at the edges of the extruded web, are such that the outer edge of the uninsulated portion is just inside the edge of the web. The insulating sleeves 11 and 11' should be adjusted so that the exposed wire does not have a free electrical path to the roll, to prevent sparking between the wire electrode, charged from voltage source 23, and the grounded quench drum.

The insulating material used to form the dielectric sleeves in the preferred apparatus of the instant invention can include any dielectric that can be formed into a substantially rigid cylinder, such as hard rubbers and resins, e.g., fluorocarbon resins, urea formaldehyde resins, filled phenol formaldehyde resins, nylons and cast epoxy resins. It has been found that "Teflon" fluorocarbon resins are particularly well suited for this application, being stable at temperatures encountered in the vicinity of the casting hopper, and having excellent insulating properties. The insulating coating 17 for the wire electrode can be prepared from the same materials as the dielectric sleeves as well as other insulating materials such as polyimides, polyketones, and polyolefins.

In operation of the present apparatus, the uninsulated portion of the wire electrode will necessarily vary with the thickness of the film, the width of the extruded web, the speed of the extrusion operation and the particular polymer involved. In general, to obtain the benefit of edge stabilization associated with edge pinning, the uninsulated portions of the wire electrode at each edge should comprise at least about 0.5 centimeters in length each. However, each uninsulated portion of the electrode should in no case extend beyond about 5 percent of the total width of the extruded film, and preferably less than 3 percent, to prevent the surface defects normally associated with full wire pinning at exceptionally fast extrusion rates.

In the operation of the apparatus, maximum edge stabilization with minimum distortion of the web is obtained by centering the pinning force over the bead or thickened portion at the edge of the extruded web.

The use of the instant apparatus effects a remarkable improvement in the customary weakening effect on the film edge that occurs when conventional point probe pinning apparatus is used. This effect is illustrated in FIGS. 3 and 4, which are cross sectional illustrations of the edges of extruded webs having been pinned using point probes and the apparatus of the instant invention, respectively. In FIG. 3, web 19, having been extruded onto quench surface 21, is pinned to the quenching surface using point probe 30. A marked depression 31 develops in edge bead 32, causing a weakening of the web and contributing to waste by additional shoulder 33 thrown up by the sharp pinning force, which must be slit off the useful web and discarded. By contrast, in FIG. 4, the pinning force generated from uninsulated wire electrode 12 forms a gentle curvature 41 away from the edge of the web.

By use of the apparatus of the instant invention, it has been found that the amount of waste due to edge trim from the web can be reduced by 25 percent or more over the amount encountered in conventional point probe pinning. In addition, the present apparatus is readily adjusted during the pinning process and of relatively simple construction. Further, the apparatus of the instant invention results in increased strength at the edge of the web, thereby reducing breakage during transverse orientation, in which the edges of the film are gripped by the stretching apparatus. Still another advantage of the invention is the ability to readily adjust the location of the edge pinning force, for example, to accommodate changes in the width of the extruded web.

If the procedures of the following example of the invention are carried out, the indicated results will be obtained.

EXAMPLE

A polyethylene terephthalate film is melt extruded onto a quenching drum at a thickness of about 10 mils and a width of about 110 centimeters. An apparatus of the type illustrated in FIG. 2 is positioned above the touchdown point of the web onto the drum. The pinning wire has a diameter of about 0.20 millimeter, with a voltage applied thereto of about 8 kilovolts. Sleeves 11, 11', 14 and 14', fabricated of "Teflon" fluorocarbon resin, are adjusted to provide a length of uninsulated wire about 1.5 centimeters long, beginning over each lateral edge of the web and extending inward. The pinning apparatus satisfactorily stabilizes the edge of the web.

The film is biaxially oriented by stretching 3.3 times the original dimension of the film, in each of the machine and transverse directions, to give a final product having a thickness of about 1 mil. The edge portions of the film are cut off. The weight percent of commercially acceptable film, after removal of edge trim, is about from 2–5 percent greater, based on weight of extruded polymer, than is usually obtained after trimming in operations using point probes.

We claim:

1. In an apparatus for pinning a molten thermoplastic polymeric film extruded from a die onto an electrically grounded quenching surface, which apparatus comprises at least one single-strand wire electrode extending across at least the full width of the extruded film, connected to a high voltage source and postioned substantially parallel to the quenching surface above the approximate touchdown points of the film, the improvement which consists in at least the centermost 90 percent of the wire electrode between the lateral edge portions of said film being insulated by a dielectric sheath and uninsulated portions being in proximity to the lateral edges of the molten film.

2. An apparatus of claim 1 wherein each of the lateral portions of the film in proximity to the uninsulated electrode comprises less than 5 percent of the total width of the film.

3. An apparatus of claim 1 wherein each of the lateral portions of the film in proximity to the uninsulated electrode comprises less than 3 percent of the total width of the film.

* * * * *